Patented Apr. 1, 1941

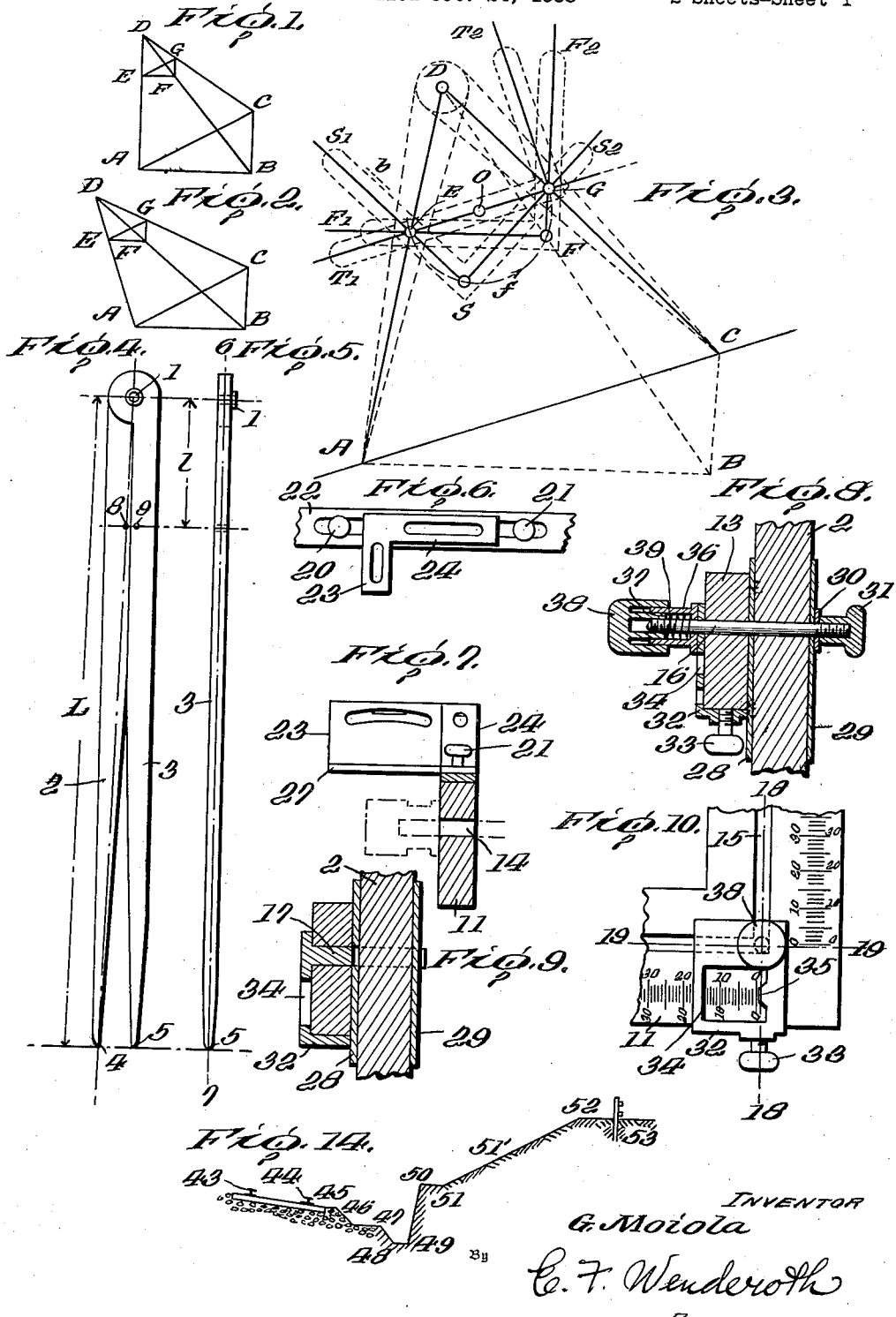

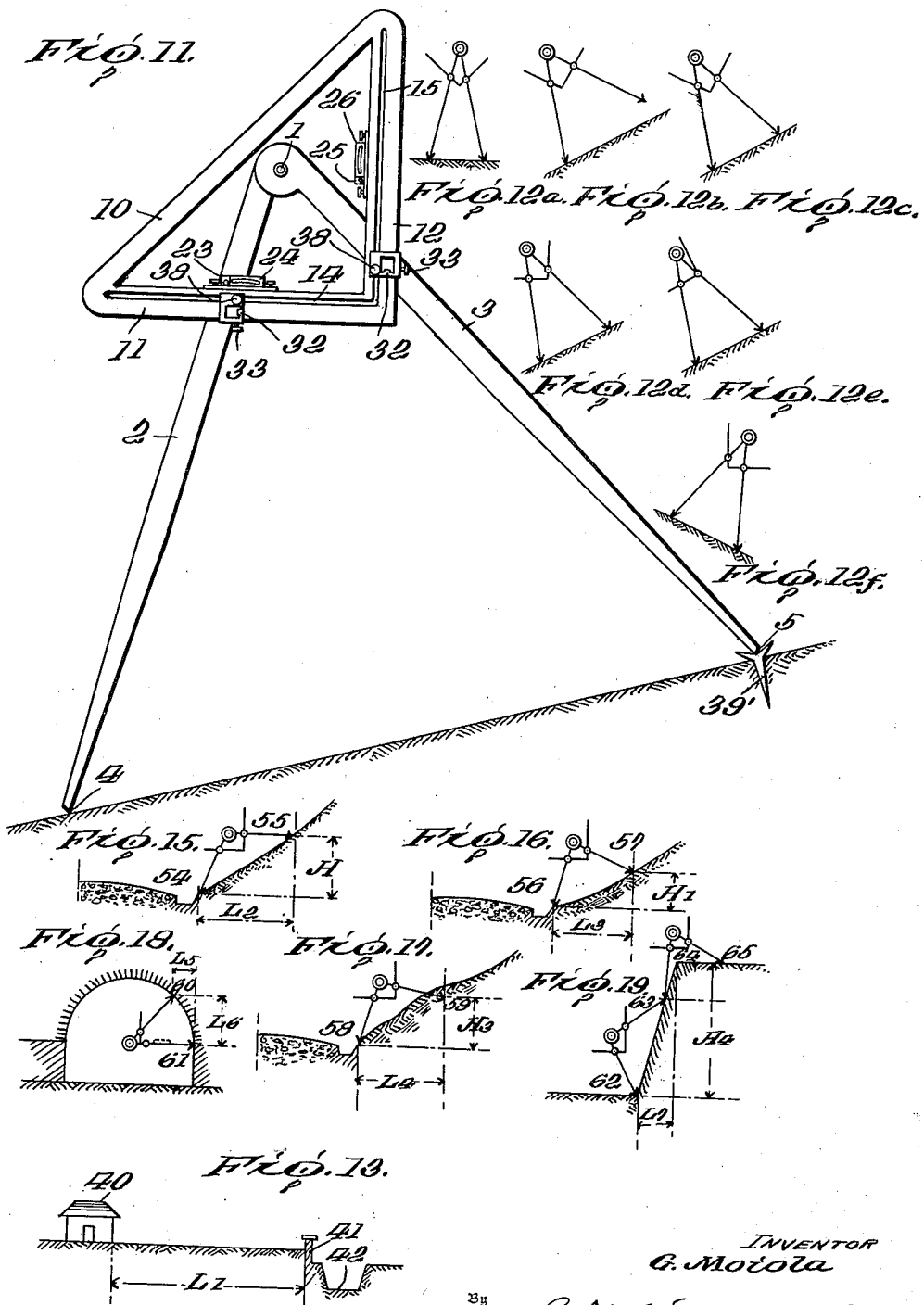

2,236,949

UNITED STATES PATENT OFFICE 2,236,949

TACHYMETRIC COMPASS

Giovanni Moicla, Rome, Italy

Application October 24, 1938, Serial No. 236,761
In Italy November 24, 1937

9 Claims. (Cl. 33—1)

The present invention relates to tachymetric compasses.

It is an object of the invention to provide a new and improved tachymetric compass in which a member having mutually perpendicular guides cooperates with means provided upon the legs of the compass.

A further object of the invention is to provide graduated sides upon the member and pointers cooperating with said graduations secured to the legs of the compass.

A further object of the invention is to provide levels which are positioned parallel to the guides on the member mounted on the legs of the compass.

With the above and other objects in view which will become apparent from the detailed description below, the invention is shown in the drawings in which:

Fig. 1 is a diagrammatic view illustrating the principle upon which the present invention is founded.

Fig. 2 is a diagrammatic view also illustrating the principle upon which the present invention is based.

Fig. 3 is a diagrammatic view of the constructional features embodied in the present invention.

Fig. 4 is a front elevational view of the compasses alone.

Fig. 5 is a side view of the compasses shown in Fig. 4.

Fig. 6 is a plan view of the levels utilized on one of the rulers.

Fig. 7 is a cross-sectional view taken on one of the rulers showing the front elevational view of the vertical level.

Fig. 8 is a cross-sectional view through one of the legs of the compasses illustrating the connection between the leg and the square and also illustrating one of the measuring devices.

Fig. 9 is also a cross-sectional view illustrating a detail.

Fig. 10 is a partial front elevational view of the right angular corner of the square with the measuring device thereon.

Fig. 11 is a front elevational view of the entire apparatus.

Figs. 12a, 12b, 12c, 12d, 12e and 12f are diagrammatic views illustrating the manner in which the instrument may be used.

Fig. 13 is a diagrammatic view illustrating a type of terrain upon which the instrument may be used.

Fig. 14 is a diagrammatic view illustrating another type of terrain upon which the invention may be used, and Figs. 15 to 19 inclusive, disclose diagrammatic view of other types of terrain and structures upon which the invention may be used.

The present invention is based upon a principle of geometry which will be briefly described particularly with reference to Figs. 1 and 2 of the drawings.

In Fig. 1 a right-angled triangle ABC is shown with the right-angle at B. An isosceles triangle ACD having the equal sides AD and CD is built on the hypotenuse AC. The line BD is drawn and then from a point E located at any desired position upon the side AD a straight line EF parallel to the line AB is drawn. From the point F on the line DB a straight line FG parallel to the side BD is drawn. The points E and G are connected by the straight line EG which will be parallel to the line AC.

In Fig. 1 there are therefore the following similar triangles:

ABC similar to EFG
ABD similar to EFD
BCD similar to FGD

From the above similar triangles, the following proportions are obtained:

$AB:EF=AD:DE$ (a)
$BD:FG=AD:DE$ (b)
$AC:EG=AD:DE$ (c)
$AB:DE=CD:DG$

If it is assumed that AD; DE; EF; FG and EG are known and AB; BD and AC are unknown, by considering the proportions (a), (b) and (c) above, the following equations are obtained:

$$AB=\frac{EF\times AD}{DE};\ BC=\frac{FG\times AD}{DE};\ AC=\frac{EG\times AD}{DE}$$

By dividing the straight line AD into $n$ equal parts and supposing DE one of these parts, DE is then $$=\frac{AD}{n}$$

In the resolution of the proportions by substituting DE with $$\frac{AD}{n}$$

the result is:

$$AB=(EF\times AD):\frac{AD}{n}=EF\times n \quad (1)$$

$$BD=(FG\times AD):\frac{AD}{n}=FG\times n \quad (2)$$

$$AC=(EG\times AD):\frac{AD}{n}=EG\times n \quad (3)$$

Referring to Figure 2, it may also be proved that the above principle always applies whether the sides AD and DC are equal or not, also regardless of the angularity of angle ADC and regardless of the length of AC provided the six triangles mentioned above with respect to Figure 1 are similar.

The above principle will now be applied practically and reference is made to Figure 3 considered in a vertical plane.

Supposing AC to be an inclined tract of land with AB the horizontal and BC the vertical distance between the said points B and A on the ground. Supposing a pair of compasses open, DA and DG being the geometric straight lines connecting the center D of the rotation axis of the compasses with the points A and C lying on the corresponding points A and C of the ground with C being supposed higher than A. E and G are the points of the axis of two pivots applied to the legs of the compasses perpendicularly to the vertical plane, these points being on the straight lines DA and DC. The condition subsists that $$DE = DG; \frac{AD}{DE} = n$$

A right-angled square is applied to the pivots of the compasses in such a way that the axis $S^1-S$ and $S-S^2$ of the square are on the points E and G of the pivots. The square is moved in such a manner that said axis slides on the points E and G, keeping always this position.

According to geometry, the triangle inscribed in a semicircle, with the hypotenuse corresponding to the diameter and with the vertex opposite to the hypotenuse on any point whatever of the circumference, is a right-angled triangle and therefore the vertex S during its motion can only describe the semi-circumference ESFG. Supposing there is a cylindrical liquid level with the air bubble $b$, applied parallel to the axis $S^1-S$ and if the square is slid in such a way that the vertex S follows the direction of the arrow $f$ then when the air bubble of the level is centered, the axis of the square will have assumed the new position $F^1-F-F^2$ and consequently $F^1-F$ is horizontal and parallel to AB and $F-F^2$ is vertical and parallel to BC. Thus the same triangles according to Fig. 1 are obtained, that is:

ABC is similar to EFG.

Supposing the number $n$ to be known, by directly measuring the segments EF and GF on the square applying the Formulae 1 and 2 the distances AB, horizontal and BC, vertical, between the points A and C of the ground may be determined.

Should the effective distance between said points A and C be determined, after knowing the two distances AB and BC the pythagorean theorem may be used but also for this problem the technical application is justified. For this object supposing a ruler is fixed with an end to the pivot E of the compasses but rotatory so that the axis of the ruler may slide on the axis of the other pivot G measuring directly on the axis of the ruler the extent comprised between the axis of the two pivots by applying the Formula 3 the effective distance may be settled between the points A and C and thus the problem solved without any calculation.

But the problem may also be solved by utilizing the ruler used as a hypotenuse operating with the square with greater easiness and simplicity as follows:

The motion of the vertex S of the square is always continued according to the direction of the arrow $f$ until the position G is reached, the axis of the square taking consequently the new position $T^1-G$ and $G-T^2$ on which the segment GE will be directly measured and then the Formula 3 will be employed as used for the hypotenuse ruler. As, however, the points E and G are variable on the square according to the span of the compasses and to the position on the ground, it is convenient to practically effect the measurements considering as origin (zero) the vertex of the square and according to this idea there is provided on each ruler representing a small side of the square a graduation, its subdivisions having the length of $$\frac{1}{n} \text{ cm.}$$

and then the progressive numeration of the divisions is made. In such a way a graphic scale of proportion is obtained on each ruler with the distances in cm. being consequently directly read on said rulers. After considering the principle and studying the practical case, the technical application is easily conceived and an instrument may now be described with a length of 1.75 m. and a number $$n = \frac{1.75}{5} \text{m.} = 0.35 \text{ m.}$$

These dimensions are satisfactory for the practical uses the instrument is designed for.

An embodiment of a complete operative instrument is shown in Fig. 11 in operative position. The instrument comprises the following parts:
A. The compasses proper.
B. The right-angled square or member with mutually perpendicular guides.
C. The levels.
D. The measuring mechanism or device.

The compasses proper are of the usual form shown particularly in Figs. 4 and 5 wherein the other parts of the instrument are removed. The hinge or pivot point is shown at 1 and the legs at 2 and 3. The legs terminate in the edge-shaped points 4 and 5 with the edges extending parallel to the axis of the pivot 1. In the compasses the general plane is considered as passing through the middle as shown by the straight line 6—7 in Fig. 5. The length L from the pivot point 1 to the edges 4 and 5 is 1.75 m. in the general plane 6—7 of Fig. 5. In the legs of the compasses there are provided two circular holes 8 and 9 shown in Fig. 4 and these holes are perpendicular to the general plane of the compasses with their axes located on the lines 1—4 and 1—5. The distance $l$ from the pivot 1 to the axes of the holes is 0.35 m. The pins upon which the square and the measuring device are mounted are fixed in the holes 8 and 9.

The square or the member having mutually perpendicular guides is generally right-angular and such member is shown in Fig. 11 combined with the compasses, liquid levels and reading pointers. The square comprises three rulers 10, 11 and 12 whose cross-sectional area is rectangular as shown particularly at 13 in Fig. 8. The rulers 11 and 12 which form the sides of the right-angular portion of the square are provided with mutually perpendicular guides 14 and 15 whose cross-sectional area is rectangular throughout the entire length of $0.35 \times 2$. In these guides 14 and 15 the pins 16 and the slides 17 of the pointer are guided. The diameter of the pins, the width of the slides 17 and the width of the guides 14 and 15 should be perfectly equal.

In the square the axes shown at 18—18 and 19—19 in Fig. 10 pass through the center of the mutually perpendicular guides and are at right-angles to one another. At the vertex of the axes 18—18 and 19—19 there is provided the graphic scale of proportion with the starting point indicated as zero. The subdivisions are perpendicular to the axis of the ruler on which they are provided. The distance between two subdivisions is 2 mm. and each subdivision represents one centimeter. Since during operation the rulers may assume both horizontal and vertical positions the indicia is provided as shown in Fig. 10 reading in both directions. The two rulers 11 and 12 are also each provided with two threaded holes positioned at the points 20 and 21 as shown in Fig. 6 for the mounting of the levels. 22 in Fig. 6 indicates the top surface of the ruler 11. The plane formed by the axes 18—18 and 19—19 is located parallel to the general plane of the compasses proper. The ruler 10 serves only as a constructional element and may, of course, be omitted entirely.

There are four levels provided upon the instrument and shown at 23, 24, 25 and 26 with two levels provided upon each of the rulers 11 and 12. Effective use of the instrument, however, requires only two levels, namely, those which are applied and function in horizontal position. The levels are preferably of the cylindrical type with air bubbles and with respect to their sensitiveness they are of the type known as half-sensitive which permits a precision adapted to the exactness of the measurements obtained with the instrument. The glass tube of the levels is provided with several indicia of which the two principal ones are longer than the others at the same distance from the central tangent to the curve of the level. The distance between the principal indicia is equal to the length of the air bubble. The other secondary shorter indicia are provided laterally and symmetrically to the principal ones. Such a type of level is preferred in order to be able to correct with greater exactness said level although no device with elevating screws is required for centering the level.

A plan view of two of the levels is shown in Fig. 6. The level 24 extends parallel to the axis of the ruler upon which it is mounted and gives the horizontal indication. The level 23 is normally united with the ruler and serves for the vertical indication. The level for giving the vertical indication is shorter than that used for the horizontal indication. The levels are provided with a T-shaped fitting 27 which is mounted by means of the screws 20 and 21 to the ruler. The levels are also provided with adjusting screws.

There are two measuring devices, one for each of the rulers 11 and 12 and since they are exactly alike, one only will be described. The measuring device is shown in Figs. 8, 9 and 10 on the leg 2 of the compasses. Adjacent the hole 8 there are provided two plates 28 and 29. In the plate 28 which is on the side of the leg 2 upon which the square is mounted there is provided a circular hole having the same diameter as the pin 16. In the plate 29 there is also provided a hole of the same diameter but in such hole there has been left a circular segment. The pin 16 is first passed through the hole in the plate 28 and the end which passes through the hole in the plate 29 is provided with threads which have a flat portion corresponding to the circular segment left in the hole of the plate 29 so that said pin is prevented from rotation. A washer 30 is passed over such threaded end of the pin and a threaded nut 31 is threaded on the pin in order to fix such pin to the leg 2 of the compasses. With the pin so fixed in position the square is mounted thereon by passing the pin through the slotted guide 14 with the scale thereon towards the outside. Then the pointer member 32 is mounted upon the pin 16. In cross-section this pointer member is L-shaped, as shown particularly in Figs. 8 and 9 and in the lower portion thereof a set screw 33 is provided so as to lock the pointer member to the square. In the pointer member, as shown in Fig. 10, there is provided an opening 34 through which the scale on the ruler is visible. Extending into such opening is a projection 35 constituting the actual pointer. The edge of the projection 35 is perpendicular to the axis of the ruler upon which the pointer member slides and also corresponds with the axis of the pin, as shown in Fig. 10. The pointer member is also provided with a slide portion 17, see Fig. 9, which extends through the guide opening 14 to the extent indicated by dotted lines in Fig. 9. The width of such guide portion 17 corresponds with the width of the guide opening 14. After the mounting of the pointer member 32 a sleeve member 36 is mounted upon the pin 16, see Fig. 8, and a coil spring 39 coacts therewith for properly regulating the friction between the square and the leg of the compasses. This end of the pin is also provided with threads and the assembly is completed by a washer 37 and a nut 38 threaded upon this end of the pin 16. The nut 38 is also provided with an annular groove to accommodate the sleeve member 36.

When the set screw 33 locks the pointer member 32 to the ruler the square may rotate around the pivot which may be located at any point along the guide of the ruler in correspondence with the axis of the pin 16. The exactness of the instrument, of course, resides in the precision and perfection of the construction.

Adjustments and corrections are executed according to the normal and common measures now serving for topographical instruments in general.

The way in which operations are carried out with the above-described instrument will now be described.

The instrument functions by means of progressive movements in the same direction and may be used by proceeding both towards the right and towards the left, regardless of the nature of the road. There is no necessity of turning around with the instrument on either a rising or a downwardly sloping road, since the rulers 11 and 12 may be disposed either to the right or to the left. The ruler for measuring altitude is always located at the side of the high point of the road. Furthermore, the instrument may be easily used by only one operator since the readings may be recorded on a small desk or table connected in any desired manner to a leg of the compass.

Since bearings may be taken with considerable speed, whenever a greater precision may be required, special pegs may be fixed in the road, of the type shown at 39' in Fig. 11.

Various ways in which the instrument may be used are shown in Figs. 12a to 12f. In Fig. 12a the left leg is held fast with the left hand under the pivot and the same is done with the right hand while endeavoring to give the general plane of the compasses a nearly vertical position.

In Fig. 12b the span of the compass is fixed and is adapted for lowering down the point of the place, the bearings of which are to be taken.

In Fig. 12c, by opening and closing according to the span and keeping the left point still on the ground, the right point is placed on the point, the bearings of which are to be taken.

In Fig. 12d, the compasses are held with the left hand and with the right hand the ruler for altitudes is operated. Such ruler is caused to slide on the pivots and at the same time the general plane is rotated. The points of the compasses remain on the ground until both of the levels of the horizontal ruler are centered. The altitude ruler is always located at the side of the highest point in the road but if the road is horizontal both of the rulers may be used as desired for measuring distances. The readings are taken on the rulers and then registered.

In Fig. 12e should the effective measure between two points on the road be desired, the vertex of the square is taken on the pivot of the altitude ruler and the reading occurs on the other ruler.

In Fig. 12f the position of the instrument is shown when the road slopes down and the altitude ruler is located on the right. In the case of Figs. 12a to 12f the vertex of the square always moves in the part comprised between the points of the compasses and the pivots of the pointers.

The compasses may also assume the position shown in Fig. 18. However, in this case the application of the square has to be reversed on the pivots so that the square may equally function, that is, with the central tangent point directed upwardly. In this case the vertex of the square moves in the part between the axis of rotation of the legs of the compass and the pivots of the pointers.

Practical survey operations

The problems which may be solved by using the tachymetric compasses according to this invention are numerous but the principal and more important ones may be summed up as follows:

Measurement of distances

Though the measurement of distances may appear to be a very simple topographical operation, nevertheless mistakes may easily be committed. By using the tachymetric compasses the methods are different and they may be utilized according to the precision, speed and reliability desired.

Referring to Fig. 13, suppose that the distance Ll is to be measured between the building 40 and the breast work or parapet of a trench 42.

a. If the ground is substantially horizontal and the measurement has a limited importance then the slight differences of level may be neglected, the special pegs need not be used and the greatest importance consists in keeping the alignment traces as unaltered as possible. Since, however, pegs are not used a given measure is established on the compasses, for instance 3 meters, in order to quicken the measurement. This is done by fixing a pointer at zero and the other pointer at the graduation 300. Then the spans of the compasses are counted and at the end after disengaging the square from the legs of the compasses the eventual distance is measured.

b. If, on the contrary, the greatest precision is desired, it is necessary to use and fix the pegs before carefully tracing the alignment taking the distances and to exactly obtain the horizontal positioning of the ruler. In such a way it is very difficult to commit any mistakes since different lengths are registered and repetitions and omissions are not possible.

The measurement of distances and elevations

Referring to Fig. 14, suppose a section of a railway line is to be measured. In this case the points to be leveled are determined by changes of elevations. It is therefore superfluous to use the pegs excepting in the case where one is located at the point 51' between the point 51 and the point 52 and in case the span of the compasses is not sufficient for the measurement. However, should the points be near one another, then it would be easier and more advantageous for greater precision to make the measurement by keeping the left point fixed and taking the bearings of the subsequent points by means of the right point of the compasses if the span of the same permits this. The intermediate measurements are then determined through differences allowing for the various elevations a positive or negative sign with respect to the point leveled with the left leg, that is the fixed point. For the sections it is convenient to provide beforehand a table for registrations as used for surveying with 3 meter poles and levels. Practically, at the first station the bearings may be taken of the points 43, 44, 45 and 46; at the second station of the points 46, 47, 48, 49 and 50; at the third station of the points 51 and 51'; at the fourth station of the points 51' and 52 and at the fifth station of the points 52 and 53. The operation begins by placing the left point of the point 43 with the right one on the point 44. The distance is then read corresponding to the distance between the points 43 and 44. The elevation is also read and it is negative with respect to the point 43. The left point remains fixed and the right point is brought to the point 45. The distance is then read corresponding to the one between points 43 and 45 (referred to point 43). The elevation is read and it is negative as referred to point 43. The left point is kept fixed on point 43 and the right point is brought to the point 46. The distance is read (referred to point 43) and the difference of elevation is also read and it is negative as referred to point 43. The work at the first station is thus finished. The work at the second station begins by placing the left point of the compass on the preceding point 46 and proceeds as set forth above with relation to the first station. It must not be forgotten that the measurements are always referred to the point at which the point of the compass is fixed while those referring to differences in elevation are also referred to the fixed point as being positive if the vertical ruler is on the right and negative if such ruler is on the left. In any case in order to facilitate the survey the registering table has a column thereon where sketches and remarks about every single station of the compass may be inserted.

Distance between two points having a given difference in elevation

In Fig. 15 there is shown a section of a road. The difference in elevation between the points 54 and 55 is supposed to be H=1.60 m. In order to determine the point 55, the pointer of the ruler for elevations is brought to the graduation 160 on the scale and the pointer is fixed to the ruler by means of the set screw provided on the pointer. The difference in elevation being positive, the left point of the compasses is placed on point 54 and the right point is placed on the ground and is slid upwardly and downwardly until the air bubble is centered. The distance is then read on the horizontal ruler, for instance L2=2.50 m. between the points 54 and 55 having a difference in elevation of 1.60 m.

*Difference in elevation between two points at a given distance*

In Fig. 16 there is shown a section of a road in which the distance L3=2.00 m. between the two points 56 and 57. The difference in elevation H1 between these two points is to be determined. The pointer is placed on the elevation ruler at the graduation 200 and such pointer is then fixed to the ruler. The point to be determined being positive the vertical ruler for elevations will be on the right. The left point of the compasses is fixed at point 56 and the right point is lowered to the ground and caused to slide up and down until the air bubble is centered. The reading then on the elevation ruler gives the difference in elevation H1=0.95 m.

*Determination of a point at a given difference of elevation and at a given distance from another point*

Fig. 17 illustrates a section of a road and with reference to the point 58 another point 59 is to be determined at a distance L4=2.20 m. and at a difference in elevation (positive) H3=1.30 m. therefrom. On the distance ruler the pointer is fixed at the graduation 220 and on the elevation ruler the pointer is fixed at the graduation 130 so that the compass legs are locked in position. The elevation ruler will be on the right. The left point of the compass is fixed on the ground while the right one is lowered thereto. Should the bubble in this position be centered then the desired point is immediately determined. If otherwise, then it may be necessary to find such point by digging for it if it is underground, as shown in Fig. 17, while if above the ground a peg will have to be placed there.

In addition to the problems above mentioned there are two practical cases which are quite common.

In Fig. 18 there is shown a semi-circular arch in which the bearings of the break 60 are to be determined with respect to the impost 61. L5 and L6 are therefore to be measured but in this case the square must be reversed on the pivots because otherwise the levels would be upside down and would consequently be inoperable.

In Fig. 19 there is shown a sloping wall which cannot be directly measured by the compass, both on account of the height thereof and the inaccessibility of the lower part. In this particular case, as shown in Fig. 19, the bearings of the point 62 and 63 are taken from the lower part and the bearings of the points 63, 64 and 65 are taken from the upper part and then the measurements H4 and L7 are obtained by calculation.

From the above description of the instrument and the problems in which it may be used, the efficiency of the instrument is, in the larger number of cases especially those involving broken ground, trenches, precipices, ruined terrain and the like, far greater than with other instruments now used, such as 3 meter poles, tape measures, chains and levels.

In the case of limited determinations and surveys the instrument according to the invention may also take the place of surveyors' levels.

It is practical and useful to use the instrument in many cases such as in the direct survey on the ground of leveling curves, tracing of lines in the cross-sections in general works, tracing on the ground of the passage lines between subsequent sections and the like with a surprising speed and precision.

Furthermore, the instrument may be employed by persons with no technical knowledge and the precision obtained is far greater than by using 3 meter poles and similar instruments.

The present invention has been described and illustrated in some preferred forms of realization, but it is understood that changes may be introduced according to circumstances.

In some cases, for instance, the tachymetric compass may be reduced to the form of a simple rod of a fixed length provided with two points, two pivots and a square with a liquid level. Simple geometrical considerations not deserving to be mentioned here, prove that said simple rod provided with points, pivots, square and level is equivalent to the tachymetric compass according to invention when this one is used with a fixed span.

Of course, as already pointed out the constructive particulars of the compass, the materials employed, the dimensions mentioned, may be varied according to the exigencies of the single practical cases.

Having now particularly described and ascertained the nature of my said invention and in what manner the same is to be performed, I declare that what I claim is:

1. A tachymetric compass comprising a pair of pivoted legs, a member having mutually perpendicular guides and means on each leg slidably and pivotally engaging one of said guides.

2. A tachymetric compass comprising a pair of pivoted legs, a square having mutually perpendicular guides and means on each leg slidably and pivotally engaging one of said guides.

3. A tachymetric compass comprising a pair of pivoted legs having apertures therein located at a distance from the pivotal point of said legs proportional to the length of said legs, a member having mutually perpendicular guides and pins located in said apertures slidably and pivotally engaging said guides.

4. A tachymetric compass comprising a pair of pivoted legs, each leg having an aperture therein located at a distance from the pivotal point of said legs proportional to the length of said legs, a member having mutually perpendicular guides, a pin located in each aperture slidably and pivotally engaging one of said guides and levels positioned on said member parallel to said guides.

5. A tachymetric compass comprising a pair of pivoted legs, each leg having an aperture therein located at a distance from the pivotal point of said legs proportional to the length of said legs, a member having mutually perpendicular slots therein, a pin located in each aperture extending into one of said slots so as to slidably and pivotally engage therein, said member having graduated sides extending parallel to said slots and pointers fixed to said pins cooperating with the graduations on said sides.

6. A tachymetric compass comprising a pair of pivoted legs, each leg having an aperture therein located at a distance from the pivotal point of said legs proportional to the length of said legs, a member having mutually perpendicular slots therein, a pin located in each aperture extending into one of said slots so as to slidably and pivotally engage therein, said member having graduated sides extending parallel to said slots and pointers fixed to said pins cooperating with the graduations on said sides, levels extending parallel to said slots on said member.

7. A tachymetric compass comprising a pair of pivoted legs, each leg having an aperture therein located at a distance from the pivotal point of said legs proportional to the length of said legs, a member having mutually perpendicular guides, a pin in each aperture slidably and pivotally engaging one of said guides, said member having graduated sides, a pointer fixed to each pin cooperating with said graduations and means for locking said pointers to said member.

8. A tachymetric compass comprising a pair of pivoted legs, a member having mutually perpendicular guides, means on each leg slidably and pivotally engaging one of said guides and means for locking said member with relation to said legs.

9. A tachymetric compass comprising a pair of pivoted legs, a member having mutually perpendicular guides, means on each leg slidably and pivotally engaging one of said guides and means for locking said member to said last-named means.

GIOVANNI MOIOLA.